UNITED STATES PATENT OFFICE.

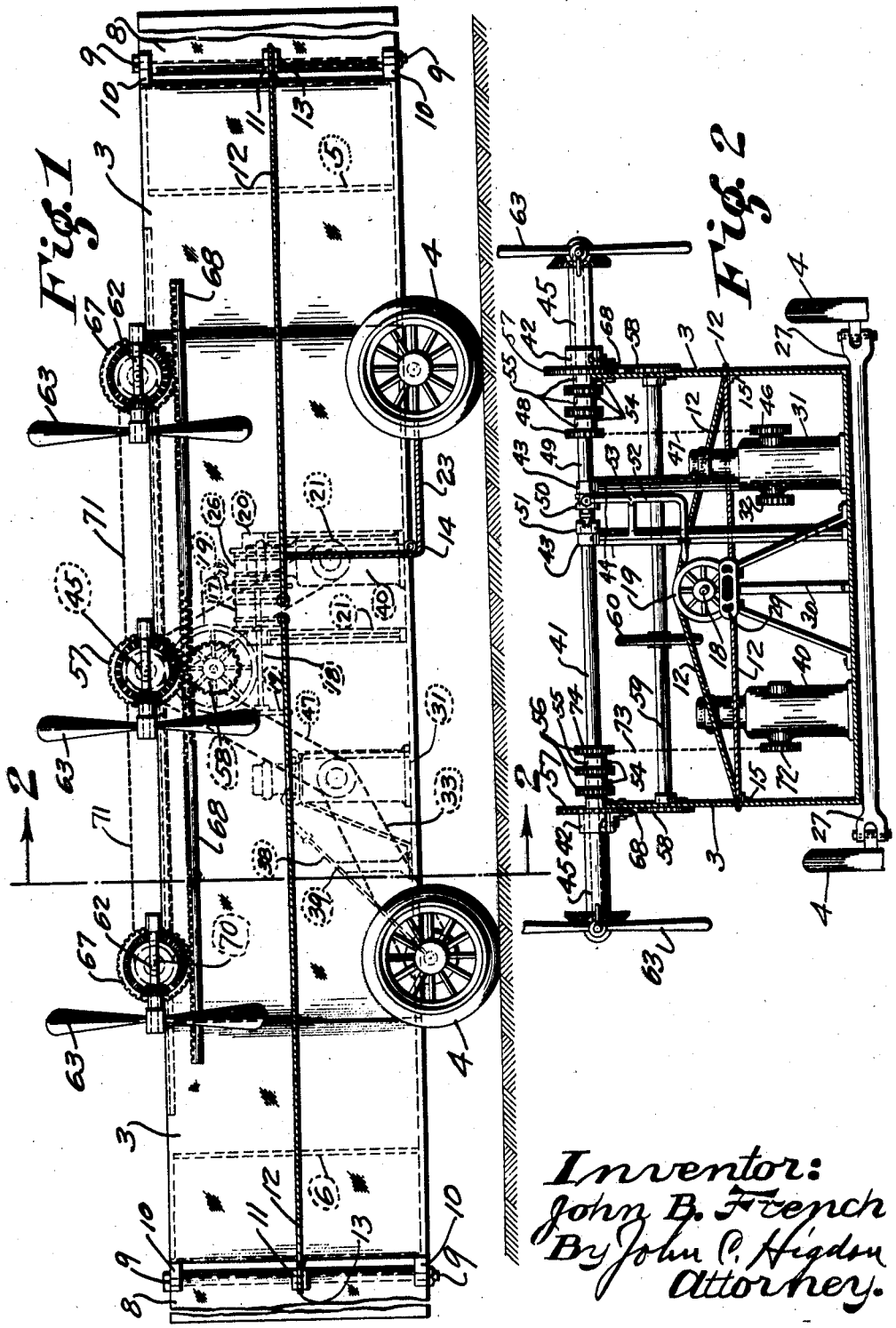

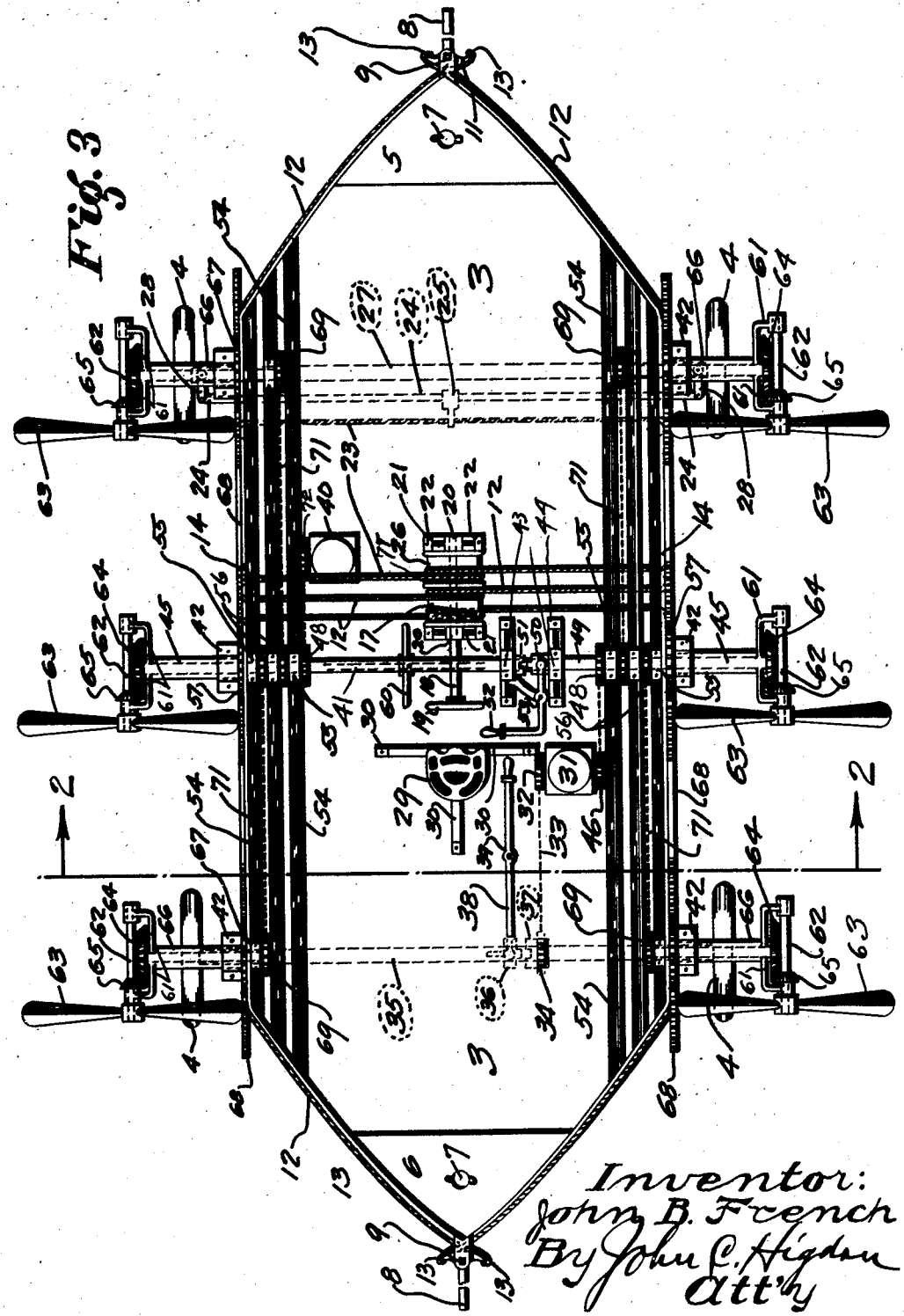

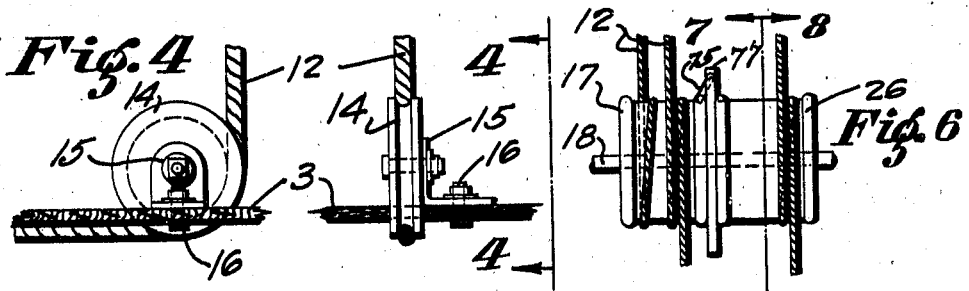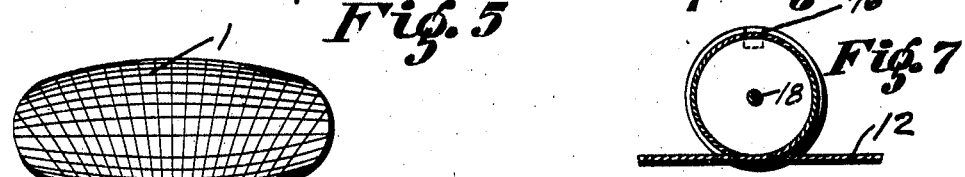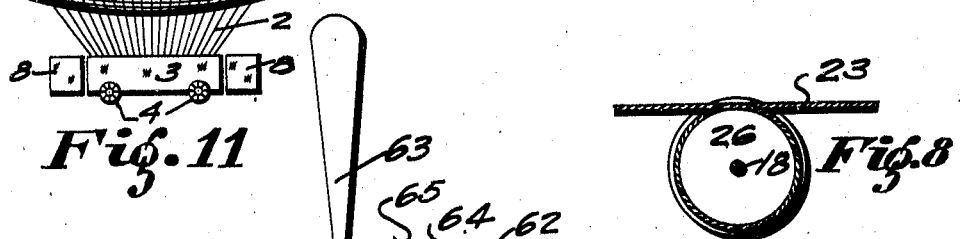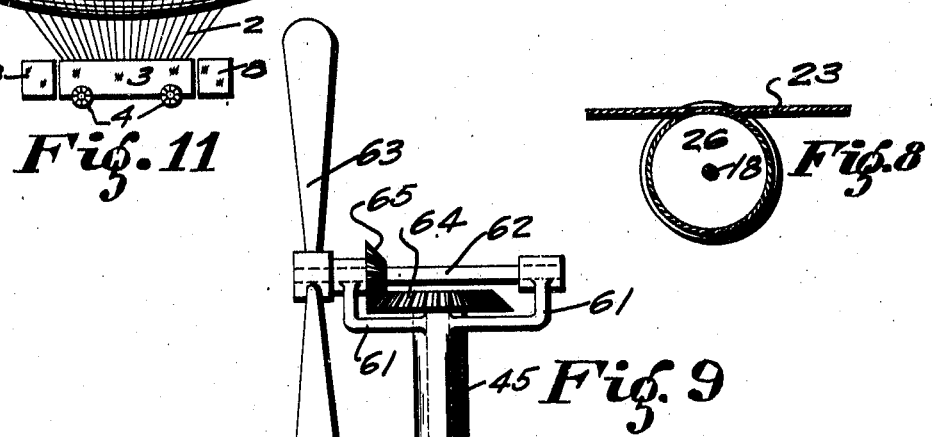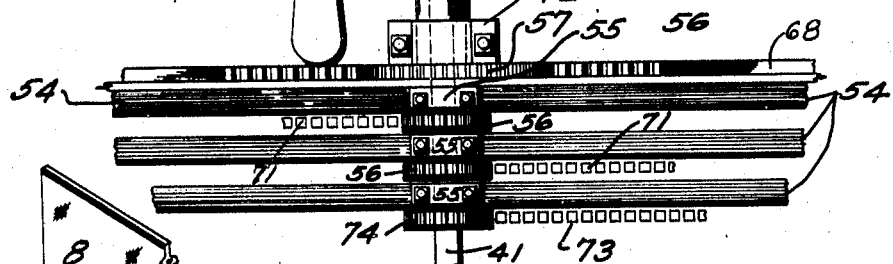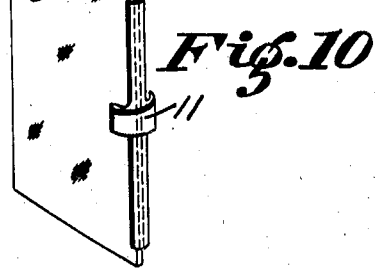

JOHN B. FRENCH, OF ST. LOUIS, MISSOURI.

COMBINED DIRIGIBLE AIRSHIP AND AUTOMOBILE.

1,329,393.      Specification of Letters Patent.      Patented Feb. 3, 1920.

Application filed September 9, 1918. Serial No. 253,229.

*To all whom it may concern:*

Be it known that I, JOHN B. FRENCH, a citizen of the United States, residing at St. Louis, in the State of Missouri, have invented certain new and useful Improvements in Combined Dirigible Airships and Automobiles, of which the following is a specification containing a full, clear, and exact description, reference being had to the accompanying drawings, forming a part hereof.

My invention relates to an improved vessel for navigating the air, and for traveling upon the land, and it consists in the novel construction and arrangement of parts hereinafter described and claimed.

The object of my invention is to provide an improved dirigible air-ship combined with an automobile, whereby the combined vehicle can readily be used (especially in war) for navigating the air, when it is desired to travel by air, to fight in the air, or to make observations; and which vehicle can easily be converted from an air-ship to an automobile, and thereby be readily used in traveling upon the land.

In the drawings,

Figure 1 is a side-elevation of my invention, ready for use as an automobile or as an air-ship.

Fig. 2 is a transverse section of same, taken on the line 2—2 of Fig. 1.

Fig. 3 is a plan view of same.

Fig. 4 is a detail view of one of the cable guide-pulleys used in carrying out the present form of my invention.

Fig. 5 is another detail view of one of said pulleys, showing the means used in mounting said pulley on the car.

Fig. 6 is a detail plan-view of the steering and rudder cable-drums.

Fig. 7 is a cross-section taken through one of said drums, on the line 7—7 of Fig. 6.

Fig. 8 is a similar view to the last, looking in the direction indicated by the arrows 8—8 of Fig. 6.

Fig. 9 is a detail plan view of one of the propellers and its mounting, together with a portion of its operating devices.

Fig. 10 is a perspective view of one of the rudders, detached; and

Fig. 11 is a miniature side-elevation of the invention arranged as an air-ship, with an inflated balloon, ready for flight.

In the present illustration of my invention, I arrange any common form of balloon or gas-bag 1, with the usual cords or cables 2 passing over the top of the balloon and extending downward to the car 3 of the automobile, which is fitted with the usual running-gear and with the common supporting-wheels 4. (See Fig. 11).

It is evident that, instead of the said gas-bag 1 (whose only use is to hold the machine in the air) I may arrange common air-planes above the said car 3 and thereby secure the necessary sustaining force in navigating the air.

Said car 3 is preferably made, as shown, in the form of a boat with both of its ends sharpened or pointed, for the usual purpose of avoiding air friction.

A suitable gasolene-tank 5 is arranged in one end of said car 3, and a water tank 6 is located in the opposite end of said car, both tanks being triangular in shape, to fit the tapered interior of the car, and each tank having the usual filling-cap 7.

The ends of said car are provided with rudders 8, which are pivoted vertically by means of a pin 9 to the rudder bearing-brackets 10 at the ends of said car 3. Each of said rudders is provided on its post-edge with a curved steering-arm 11 to the outer ends of which the crossed steering-cables 12 are attached by means of metallic hooks 13 soldered or otherwise securely affixed to the said curved arms 11.

Said steering-cables 12 extend from the said steering-arms 11 along the sides of said car 3 to a point about midway of the length of the car, and are mounted upon common grooved pulleys 14 wherever required to lessen the friction and to change the direction of the cables, said pulleys being supported by common rectangular brackets 15 secured to the side or wall of the car 3 by means of bolts 16.

At a point about midway of the length of said car 3 the direction of the said steering or rudder cables 12 is changed by passing same around guide pulleys 14 mounted at that point upon the vertical wall of the car, and thence to the interior of the car through suitable holes formed in the wall of said car to a rudder drum 17 loosely mounted to revolve upon a drum-shaft 18 having a steering-wheel 19 fixed upon one of its ends, and said shaft being itself mounted to rock or revolve in suitable bearings 20 carried by the standards or frames 21, provided for that purpose.

The said bearing standards 21 rest upon the bottom or floor of the said car 3, and are secured in place by suitable bolts or screws 22. (See Fig. 3.)

The cable 12 which controls the rudder 8 at one end of the car is wound around the said rudder-drum 17 in one direction, but the cable which controls the rudder at the opposite end of the car is wound around the said drum in an opposite direction, as shown more clearly in Fig. 6, so that when said drum is rocked or rotated the cables of the front and rear rudders will be moved in opposite directions simultaneously, and said rudders will be turned in a corresponding direction, to steer the air-ship in the desired direction.

The automobile, when the device is running upon the land, is steered by the following means:

A steering-cable 23 extends beneath the bottom of the car 3 adjacent the transverse (and usual) steering-rod 24 of the automobile, and said cable is attached to said rod by means of a common clamping-bracket 25 and passes over suitable grooved pulleys 14 and is led backwardly to a point about midway of the length of the car, and thence upwardly upon opposite sides of said car, and thence inwardly to another drum 26 on the said drum-shaft 18, and said cable is wound around said last named drum, so that when the latter is rocked or turned by means of the said steering-wheel 19 the automobile will be steered in the desired direction, it being understood that the said steering-rod 24 is connected at its opposite ends (as usual) to the steering-knuckles of the front axle 27 by the short arms or levers 28.

The driver or aviator occupies a seat 29, supported upon suitable standards and braces 30, the lower portions of which rest upon the floor of the car, so that all of the levers and controls can be conveniently reached by the person occupying said seat.

For driving the propellers upon one side of the machine, independently of those upon the opposite side, and for driving the machine when used as an automobile, I have provided a common gasolene or other form of motor 31 with a sprocket-wheel 32 over which runs a common chain 33 to another sprocket-wheel 34 normally loose upon the rear axle 35 of the automobile running-gear, for imparting motion to said axle when a common clutch-jaw 36 (splined on said axle) is thrown into engagement with another common clutch-jaw 37 fixed to said loose sprocket-wheel 34, whereby the machine will be propelled when running as an automobile; and a hand-lever 38 is pivoted at 39 to a fixed standard or other part, so that one end of said lever is connected to said splined clutch-jaw 36 while the opposite end of said lever extends to a point convenient for the driver when sitting in said seat 29.

In driving the propellers upon one side of the machine independently of those on the opposite side of the machine, an additional motor (as 40) is provided for the last mentioned propellers.

A main drive-shaft 41 extends across the upper portion of said car 3, and has its outer portions mounted to revolve loosely in sleeves 45 which are themselves revolubly mounted in suitable bearings 42 supported on the vertical side walls of said car, and said shaft is made in two sections which run in common bearings 43 at the upper ends of common bearing frames 44 rising from the bottom of the car.

Another sprocket-wheel, as 46, which is similar to the said sprocket-wheel 32, is fixed on the end of the shaft of said motor 31 opposite that on which said wheel 32 is located, and a common chain 47 connects said wheel 46 to a sprocket-wheel 48 fixed on the section 49 (at the right-hand of Fig. 2) of said main drive-shaft 41.

A clutch-jaw 50 is splined on said shaft section 49 between said bearings 43, at which point said drive-shaft 41 is cut, and said jaw is adapted to be brought into engagement with a clutch-jaw 51 fixed upon the adjacent end of the other section of said main drive-shaft, whereby said two sections of said shaft may be connected and disconnected at will.

A common hand-lever 52 is pivoted at 53 to an arm projecting laterally from one of the said bearing-frames 44, so that one end of said lever extends to a point convenient for the driver, while the other end of said lever is connected in the usual manner to the said clutch-jaw 50 of the said main drive-shaft section 49.

Fixed at each side of said car 3 are parallel bars 54, that are preferably well-known angle-bars, each bar of each series being separated a slight distance from other bars of the series.

Mounted on said angle-bars are a series of alined bearing-boxes 55, and sprocket-wheels 56 are fixed on said drive-shaft sections in the spaces between said bars.

A gear-wheel 57 is fixed upon the inner ends of the said revoluble sleeves 45, and said gear-wheel engages the teeth upon the upper edge of a double-edged horizontal rack-bar 68 which is mounted in the space between the said gear-wheel and another gear-wheel 58 fixed on the outer end of a horizontal control-shaft 59 extending across the interior of the car directly beneath and parallel with said main drive-shaft 41.

The said gear-wheels 58 engage the teeth that are on the under edge of the said double-edged rack-bars 68, so that when said wheels are rocked or rotated the said double-edged rack-bars will be correspondingly moved forward or backward.

A hand-wheel 60 is fixed on said control-shaft 59 at a point convenient for the driver occupying said driver's seat 29.

At the outer ends of the said revoluble sleeves 45 are L-shaped yoke or fork arms 61 carrying alined propeller-shaft bearings in which a propeller-shaft 62 is mounted to revolve.

A common propeller 63 is fixed upon the projecting end of each propeller-shaft 62, and is driven by a bevel-gear 64 meshing with a pinion 65, said bevel-gear being fixed on the end of the main drive-shaft section where it projects beyond the outer end of said sleeve 45.

A plurality of propellers, three in the present case, are arranged along each side of the car 3, and all have mountings and driving-mechanism substantially the same as that just described, the revoluble sleeves 66 of the additional propeller mountings having a gear-wheel 67 fixed upon their inner ends and meshing with adjacent teeth upon the upper edge of the said double-edged rack-bar 68, whereby all of the propellers may be turned simultaneously in any desired direction, to drive the air-ship forward, backward, upward or downward, as desired. (See Fig. 1).

The propeller-shafts 62 of all of the propellers are parallel so that all of the propellers will exert power in the same direction.

By manipulating the said hand-wheel 60 the propellers will all be swung around to exert power downwardly, forward, backwardly, or in any desired direction, and the air-ship will be driven accordingly.

Power is communicated to the forward and rear propellers by means of a sprocket-wheel 69 fixed on the inner end of the drive-shaft 70 within said sleeves 66, and chains 71 running over said sprocket-wheels and connecting them to the said sprocket-wheels 56 of the main drive-shaft 41.

Power from the additional motor 40 is communicated to the main drive-shaft 41 by means of a sprocket-wheel 72 fixed on the motor-shaft, and a chain 73 running over said wheel and connecting same to a sprocket-wheel 74 fixed on said main drive-shaft.

The operation of my invention will be readily apparent, without further description, except as below given.

I do not limit myself to the exact form of the various parts of my invention herein shown, as it is obvious that such changes in form and function may be made by a skilled mechanic without departing from the spirit and scope of the invention.

In Figs. 6 and 7 I have shown a swinging dog 75, pivoted at 77 to a disk or wheel 78 fixed upon the said drum-shaft 18, so as to be swung into engagement with the walls of a notch or depression 76 formed in the periphery of either the rudder-drum 17 or the automobile steering-drum 26.

Such an arrangement provides a means for connecting either the rudder-drum 17 or the automobile steering-drum 26 to the said drum-shaft 18, as required to steer the air-ship by its rudders or to steer the machine as an automobile, the said rudder-drum being disconnected when the machine is running upon the ground, and the automobile steering-drum being disconnected when the machine is in the air, and vice versa.

I claim:

An improved air-ship and automobile, composed of an automobile running-gear, suitable motive-power, a suitable mechanism for connecting said motive-power to said running-gear, to drive the machine when it is used as an automobile, a series of propellers mounted upon swiveling-sleeves upon opposite sides of the machine, gear-wheels fixed on said sleeves, double-edged racks mounted on opposite sides of the machine so that the teeth upon the upper edges of said racks will be in mesh with the teeth of said gear wheels on said sleeves, for changing the driving direction of said propellers in driving the machine up, down, forward or back; a horizontal control-shaft extending across the machine; a hand-wheel fixed on said control-shaft; gear-wheels fixed on the outer ends of said control-shaft and having their teeth in mesh with the teeth that are located upon the under edge of said double-edged rack-bars; and clutch means for independently connecting and disconnecting the propellers on either side of the machine, when the same is to be used as an air-ship.

In testimony whereof, I have signed my name to this specification in presence of two subscribing witnesses.

JOHN B. FRENCH.

Witnesses:
J. L. HAUK,
JOHN C. HIGDON.